(12) United States Patent
Kawakami et al.

(10) Patent No.: US 8,759,440 B2
(45) Date of Patent: Jun. 24, 2014

(54) HEAT-RESISTANT RESIN PASTE

(75) Inventors: Hiroyuki Kawakami, Ichihara (JP);
Kouji Yamazaki, Ichihara (JP); Takuya Imai, Ichihara (JP); Youji Katayama, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 236 days.

(21) Appl. No.: 12/375,719

(22) PCT Filed: Jun. 1, 2007

(86) PCT No.: PCT/JP2007/061192
§ 371 (c)(1),
(2), (4) Date: Jan. 30, 2009

(87) PCT Pub. No.: WO2008/015839
PCT Pub. Date: Feb. 7, 2008

(65) Prior Publication Data
US 2009/0264582 A1    Oct. 22, 2009

(30) Foreign Application Priority Data

Jul. 31, 2006 (JP) .............................. P2006-207931

(51) Int. Cl.
*C08G 69/26* (2006.01)
*C08K 5/00* (2006.01)
*C08L 77/00* (2006.01)

(52) U.S. Cl.
USPC .............................. 524/538; 524/87; 525/432

(58) Field of Classification Search
CPC ......... C08L 77/00; C08L 77/06; C08L 77/02; C08G 69/00; C08K 5/3437; C08K 5/18; C08K 5/0091
USPC ................................ 524/1, 86, 538; 525/432
See application file for complete search history.

(56) References Cited

U.S. PATENT DOCUMENTS

| | | | |
|---|---|---|---|
| 3,356,515 A * | 12/1967 | McGlothlin ................... | 106/623 |
| 5,037,862 A | 8/1991 | Nishizawa et al. | |
| 5,087,658 A | 2/1992 | Nishizawa et al. | |
| 5,164,816 A | 11/1992 | Nishizawa et al. | |
| 6,372,859 B1 | 4/2002 | Sakata et al. | |
| 7,061,081 B2 | 6/2006 | Yano et al. | |
| 2003/0082925 A1 | 5/2003 | Yano et al. | |
| 2009/0088536 A1* | 4/2009 | Kawakami et al. ........... | 525/432 |

FOREIGN PATENT DOCUMENTS

| | | | |
|---|---|---|---|
| JP | 64-036649 | 2/1989 | |
| JP | 02-289646 | 11/1990 | |
| JP | 04-085379 | 3/1992 | |
| JP | 04-285662 | 10/1992 | |
| JP | 05-009437 | * 1/1993 | ........... C09D 179/08 |
| JP | 08-081628 | 3/1996 | |
| JP | 2697215 | 9/1997 | |
| JP | 2000-119442 | 4/2000 | |
| JP | 2000-119518 | 4/2000 | |
| JP | 3087290 | 7/2000 | |
| JP | 2003-109429 | 4/2003 | |
| JP | 2003-197031 | 7/2003 | |
| JP | 2005-162905 | 6/2005 | |
| JP | WO 2006/035495 | * 4/2006 | ........... C08L 101/00 |
| WO | WO 98/54267 | 12/1998 | |
| WO | WO 01/66645 A1 | 9/2001 | |
| WO | WO 2006/035495 | 4/2006 | |

OTHER PUBLICATIONS

Translation of the International Preliminary Report on Patentability mailed Mar. 12, 2009, in Application No. PCT/JP2007/061192.
Philippine Official Action dated Nov. 21, 2012, for PH Application No. 1/2009/500125.
Official Action dated Nov. 17, 2011, for TW Application No. 096120696.
JP Official Action dated Jan. 8, 2013, for JP Application No. 2008-527679.
European Official Action dated Apr. 30, 2012, for EP Application No. 07 744 580.7-2102.
Japanese Official Action dated Jul. 31, 2012, for JP Application No. 2008-527679.
Extended European Search Report dated Sep. 2, 2011, for EP Application No. 07744580.7-2102/2055747 (PCT/JP2007/061192).
Taiwanese Official Action dated Nov. 9, 2012, for TW Application No. 096120696.

* cited by examiner

*Primary Examiner* — Bijan Ahvazi
*Assistant Examiner* — Atnaf Admasu
(74) *Attorney, Agent, or Firm* — Antonelli, Terry, Stout & Kraus, LLP.

(57) ABSTRACT

Provided is a heat-resistant resin paste excellent in heat resistance, flexibility, printability and viewability. A heat-resistant resin paste containing a first organic solvent (A1), a second organic solvent (A2) containing a lactone, a heat-resistant resin (B) soluble in a mixed solvent of the solvents (A1) and (A2), a heat-resistant resin filler (C) insoluble in the mixed organic solvent of the solvents (A1) and (A2), and a pigment (D), wherein the components (C) and (D) are dispersed in a solution containing the solvents (A1) and (A2) and the component (B).

13 Claims, No Drawings

HEAT-RESISTANT RESIN PASTE

TECHNICAL FIELD

The present invention relates to a heat-resistant resin paste, more specifically, a heat-resistant resin paste excellent in heat resistance, flexibility, printability, and viewability.

BACKGROUND ART

Heat-resistant resins such as polyimide resin are excellent in heat resistance and mechanical properties; thus, the resins have already been used widely, as a surface protective film and an interlayer dielectric of a semiconductor element, in the field of electronics. Recently, attention has been paid to screen printing or dispense coating, which does not require any complicated steps such as light exposure, development or etching, as a method for forming an image of a polyimide resin film for the surface protective film, the interlayer dielectric, a stress relaxing material, or the like.

In screen printing or dispense coating, a heat-resistant resin paste is used which contains, as constituting components, a base resin, a filler and a solvent and has thixotropy. In almost all of heat-resistant resin pastes that have been developed so far, an inorganic filler such as silica filler, an insoluble polyimide filler, or some other filler has been used as a filler for giving thixotropy. However, when the paste is heated and dried, the filler remains, as a filler, in the coating. For this reason, the following problem is pointed out: a large number of voids or air bubbles are easily generated in the interface between the base resin and the surface of the filler, so as to lower the coating strength; thus, the electric insulation is poor.

Against the problem, a heat-resistant resin paste is developed wherein a base resin and a solvent are combined with a soluble organic filler which forms, together with the base resin, a homogeneous phase without remaining as a filler in the coating when the paste is heated and dried (see Japanese Patent No. 2697215, and Japanese Patent No. 3087290). However, the formed coating is transparent in many cases since a soluble organic filler is used in the heat-resistant resin paste. Thus, there remains a problem that the coating is poor in viewability when the coating is patterned, so as to give a low workability.

An object of the invention is to provide a heat-resistant resin paste excellent in heat resistance, flexibility, printability, and viewability.

DISCLOSURE OF THE INVENTION

The invention relates to (1) a heat-resistant resin paste, containing a first organic solvent (A1), a second organic solvent (A2) containing a lactone, a heat-resistant resin (B) soluble in the first organic solvent (A1) or a mixed solvent of the first organic solvent (A1) and the second organic solvent (A2), a heat-resistant resin filler (C) insoluble in the mixed solvent of the first organic solvent (A1) and the second organic solvent (A2), and a pigment (D), wherein the heat-resistant resin filler (C) and the pigment (D) are dispersed in a solution containing the first organic solvent (A1), the second organic solvent (A2), and the heat-resistant resin (B).

The invention also relates to (2) the heat-resistant resin paste according to the above-mentioned (1), wherein the first organic solvent (A1) is a solvent containing a nitrogen-containing compound.

The invention also relates to (3) the heat-resistant resin paste according to the above-mentioned (2), wherein the nitrogen-containing compound is a nitrogen-containing cyclic compound having polarity.

The invention also relates to (4) the heat-resistant resin paste according to any one of the above-mentioned (1) to (3), wherein the lactone is γ-butyrolactone.

The invention also relates to (5) the heat-resistant resin paste according to any one of the above-mentioned (1) to (4), wherein the soluble heat-resistant resin (B) and the heat-resistant resin filler (C) are each a polyimide resin or a precursor thereof.

The invention also relates to (6) the heat-resistant resin paste according to the above-mentioned (5), wherein the polyimide resin or the precursor of the heat-resistant resin filler (C) is obtained by causing the following to react with each other in the presence of the mixed solvent of the first organic solvent (A1) and the second organic solvent (A2), which contains the lactone: a diamine containing an aromatic diamine represented by the following general formula (I), and one or more tetracarboxylic acid analogues containing an aromatic tetracarboxylic acid dianhydride represented by the following general formula (II) or a derivative thereof:

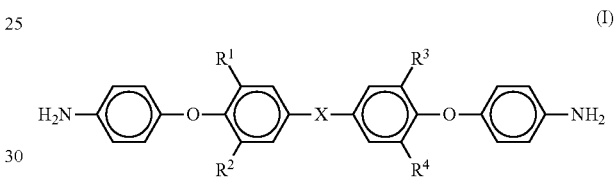

(I)

In the formula (I), $R^1$, $R^2$, $R^3$ and $R^4$ are each independently a hydrogen atom, an alkyl group having 1 to 9 carbon atoms, an alkoxy group containing 1 to 9 carbon atoms, or a halogen atom, and X is either one of a chemical bond, —O—, —S—, —SO$_2$—, —C(=O)—, —S(=O)— or a group represented by the following formula (Ia):

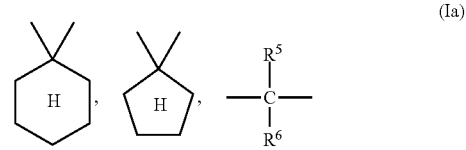

(Ia)

In the formula (Ia), $R^5$ and $R^6$ are each independently a hydrogen atom, an alkyl group, a trifluoromethyl group, a trichloromethyl group, a halogen atom or a phenyl group.

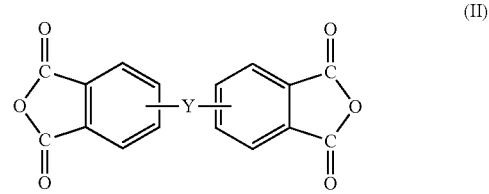

(II)

In the formula (II), Y is either one of —O—, —S—, —SO$_2$—, —C(=O)—, or —S(=O)—.

The invention also relates to (7) the heat-resistant resin paste according to any one of the above-mentioned (1) to (6), wherein the pigment (D) is of a powder which is white or close to white in color.

The invention also relates to (8) the heat-resistant resin paste according to any one of the above-mentioned (1) to (7), wherein the average particle diameter of the pigment (D) is less than 10 µm.

The invention also relates to (9) the heat-resistant resin paste according to any one of the above-mentioned (1) to (8), which has a thixotropic coefficient of 1.2 or more.

According to the invention, it is possible to provide a heat-resistant resin paste excellent in heat resistance, flexibility, printability, and viewability.

BEST MODE FOR CARRYING OUT THE INVENTION

The heat-resistant resin paste of the invention contains a first organic solvent (A1), a second organic solvent (A2) containing a lactone, a heat-resistant resin (B) soluble in the first organic solvent (A1) or a mixed solvent of the first organic solvent (A1) and the second organic solvent (A2), a heat-resistant resin filler (C) insoluble in the mixed solvent of the first organic solvent (A1) and the second organic solvent (A2), and a pigment (D).

The first organic solvent (A1) used in the invention is not particularly limited, and examples thereof include ethers such as diethylene glycol dimethyl ether, diethylene glycol diethyl ether, diethylene glycol dipropyl ether, diethylene glycol dibutyl ether, triethylene glycol dimethyl ether, triethylene glycol diethyl ether, triethylene glycol dipropyl ether, triethylene glycol dibutyl ether, tetraethylene glycol dimethyl ether, dioxane, and 1,2-dimethoxyethane; sulfur-containing compounds such as dimethylsulfoxide, diethylsulfoxide, dimethylsulfone, and sulfolane; esters such as γ-butyrolactone, γ-valerolactone, γ-caprolactone, cellosolve acetate, ethylcellosolve acetate, butylcellosolve acetate, ethyl acetate, and butyl acetate; ketones such as cyclohexanone, methyl ethyl ketone, methyl isobutyl ketone, and acetophenone; nitrogen-containing compounds such as N-methylpyrrolidone, N,N'-dimethylacetoamide, N,N'-dimethylformamide, 1,3-dimethyl-3,4,5,6-tetrahydro-2(1H)-pyrimidinone, and 1,3-dimethyl-2-imidazolidione; and aromatic hydrocarbons such as toluene and xylene. These may be used alone or in combination of two or more thereof.

The first organic solvent (A1) used in the invention is preferably a solvent containing a nitrogen-containing compound. The nitrogen-containing compound is not particularly limited as far as the compound contains a nitrogen atom. Examples thereof include the above-mentioned nitrogen-containing compounds. Of these compounds, more preferred are nitrogen-containing cyclic compounds having polarity, and particularly preferred are N-methylpyrrolidone and 1,3-dimethyl-3,4,5,6-tetrahydro-2(1H)-pyrimidinone.

The use amount of the first organic solvent (A1) is preferably 40% or more by weight of the total of the first organic solvent (A1) and the second organic solvent (A2), which contains a lactone, more preferably 50% or more by weight thereof, in particular preferably 60% or more by weight thereof. If the use amount of the first organic solvent (A1) is less than 40% by weight, the solubility of the heat-resistant resin (B) falls so that properties of the resultant paint film tend to lower.

The second organic solvent (A2) used in the invention contains a lactone, and may be a lactone alone or a mixed solvent of a lactone and a different solvent. Examples of the lactone include γ-butyrolactone, γ-valerolactone, γ-caprolactone, γ-heptalactone, α-acetyl-γ-butyrolactone, and ∈-caprolactone. Particularly preferred is γ-butyrolactone. Examples of the different solvent include the ethers, sulfur-containing compounds, esters, ketones, nitrogen-containing compounds, and aromatic hydrocarbons. These may be used alone or in combination of two or more thereof.

The use amount of the lactone is preferably from 10 to 60% by weight, more preferably from 10 to 55% by weight, even more preferably from 15 to 55% by weight, in particular preferably from 15 to 50% by weight of the total of the first organic solvent (A1) and the second organic solvent (A2), which contains the lactone. If the use amount of the lactone is less than 10% by weight, the thixotropy of the resultant heat-resistant resin paste tends to lower. If the amount is more than 60% by weight, the solubility of the heat-resistant resin (B) and the heat-resistant resin filler (C) lowers so that properties of the resultant paint film tend to lower.

The use amounts of the first organic solvent (A1) and the second organic solvent (A2) are appropriately set in accordance with the kinds and the use amounts of the heat-resistant resin (B) and the heat-resistant resin filler (C), and others. Preferably, the amount of the second organic solvent (A2) is from 10 to 70 parts by weight for 30 to 90 parts by weight of the first organic solvent (A1). More preferably, the amount of the second organic solvent (A2) is from 10 to 60 parts by weight for 40 to 90 parts by weight of the first organic solvent (A1). If the use amount of the first organic solvent (A1) and that of the second organic solvent (A2) are not in this range, the printability of the resultant heat-resistant resin paste tend to deteriorate.

The boiling point of the mixed solvent of the first organic solvent (A1) and the second organic solvent (A2), which is used in the invention, is preferably 100° C. or higher, more preferably from 100 to 300° C., considering the period in which the heat-resistant resin paste can be used when the paste is painted. By selecting the kinds or use amounts of the first organic solvent (A1) and the second organic solvent (A2) appropriately, the boiling point of the mixed solvent is set into the temperature range.

The heat-resistant resin (B) used in the invention is soluble in the first organic solvent (A1), or the mixed solvent of the first organic solvent (A1) and the second organic solvent (A2). The heat-resistant resin (B) may be either of a thermosetting resin or a thermoplastic resin. Examples of the thermosetting resin include addition-polymerization type polyimide resins such as terminal-acetylated polyimide resin, terminal-maleimidated polyimide resin, BT RESIN (trade name, manufactured by Mitsubishi Gas Chemical Co., Inc.) and KELIMIDE (trade name, manufactured by Rohne-Poulenc), melamine resin, phenol resin, and epoxy resin. Examples of the thermoplastic resin include polyamide resin, polyimide resin, polyamideimide resin, and precursors of polyimide resin. Of these resins, polyimide resin and precursors thereof are preferred from the viewpoint of heat resistance.

The polyimide resin or the precursors thereof are each yielded, for example, by causing a diamine such as an aromatic diamine compound, an aliphatic diamine compound or an alicyclic diamine compound to react with a tetracarboxylic acid analogue such as a tetracarboxylic acid dianhydride or a derivative thereof.

Examples of the diamine include aromatic diamine compounds such as m-phenylenediamine, p-phenylenediamine, 4,4'-diaminodiphenylpropane, 4,4'-diaminodiphenylmethane, benzidine, 4,4'-diaminodiphenysulfide, 4,4'-diaminodiphenylsulfone, 3,3'-diaminodiphenylsulfone, 4,4'-diaminodiphenyl ether, 3,3'-diaminodiphenyl ether, 4,4'-diamino-p-terphenyl, 2,6-diaminopyridine, bis(4-aminophenyl)phosphine oxide, 2,2-bis[4-(4-aminophenoxy)phenyl]propane, 2,2-bis[4-(4-aminophenoxy)phenyl]

hexafluoropropane, 2,2-bis[3-methyl-4-(4-aminophenoxy)phenyl]propane, 2,2-bis[4-(4-aminophenoxy)phenyl]butane, 2,2-bis[3-methyl-4-(4-aminophenoxy)phenyl]butane, 2,2-bis[3,5-dimethyl-4-(4-aminophenoxy)phenyl]butane, 2,2-bis[3,5-dibromo-4-(4-aminophenoxy)phenyl]butane, 1,1,1,3,3,3-hexafluoro-2,2-bis[4-(4-aminophenoxy)phenyl]propane, 1,1,1,3,3,3-hexafluoro-2,2-bis[3-methyl-4-(4-aminophenoxy)phenyl]propane, 1,1-bis[4-(4-aminophenoxy)phenyl]cyclohexane, 1,1-bis[4-(4-aminophenoxy)phenyl]cyclopentane, bis[4-(4-aminophenoxy)phenyl]sulfone, bis[4-(4-aminophenoxy)phenyl]ether, 4,4'-carbonylbis(p phenyleneoxy)dianiline, and 4,4'-bis(4-aminophenoxy)biphenyl; and siloxane type diamine compounds such as diaminopolysiloxane represented by the following general formula (III):

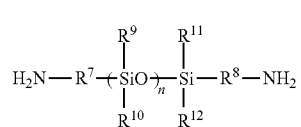
(III)

In the formula (III), $R^7$ and $R^8$ each represent a bivalent hydrocarbon group having 1 to 30 carbon atoms, and $R^9$, $R^{10}$, $R^{11}$ and $R^{12}$ each represent a monovalent hydrocarbon group having 1 to 30 carbon atoms, and n represents an integer of 1 or more. $R^7$ and $R^8$ are each preferably an alkylene group having 1 to 5 carbon atoms, a phenylene group, or an alkyl-substituted phenylene group. $R^9$, $R^{10}$, $R^{11}$ and $R^{12}$ are each preferably an alkyl group having 1 to 5 carbon atoms, an alkoxy group, a phenylene group, or an alkyl-substituted phenyl group. n is preferably from 1 to 100. Specific examples of the diaminopolysiloxane represented by the general formula (III) illustrated below include compounds of the following formulae (1) to (5):

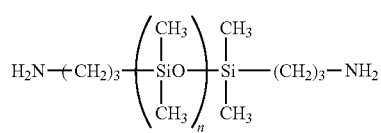
(1)

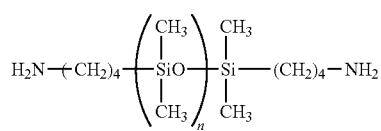
(2)

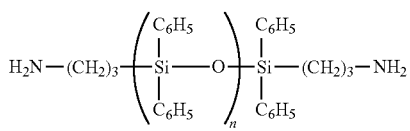
(3)

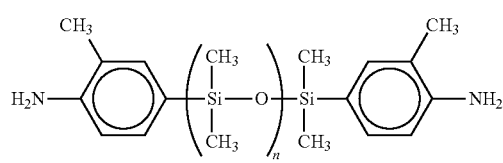
(4)

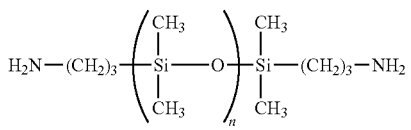
(5)

In the formulae (1) to (5), n is integer of 1 to 100.

These diamines may be used alone or in combination of two or more thereof.

The tetracarboxylic acid analogue is preferably a compound obtained by reaction of one or more tetracarboxylic acids containing an aromatic tetracarboxylic acid dianhydride represented by the following general formula (II) or a derivative thereof:

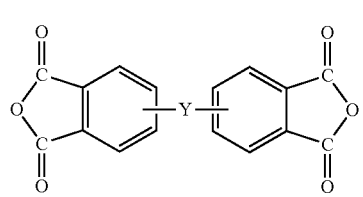
(II)

In the formula (II), Y is either one of —O—, —S—, —SO$_2$—, —C(=O)—, or —S(=O)—.

Specific examples of the aromatic tetracarboxylic acid dianhydride or the derivative thereof include 3,3',4,4'-biphenyltetracarboxylic acid dianhydride, 2,2',3,3'-biphenyltetracarboxylic acid dianhydride, 2,3,3'4'-biphenyltetracarboxylic acid dianhydride, bis(3,4-dicarboxyphenyl)sulfonic acid dianhydride, bis(3,4-dicarboxyphenyl)ether dianhydride, 3,4,3',4'-benzophenonetetracarboxylic acid dianhydride, 2,3,2',3'-benzophenonetetracarboxylic acid dianhydride, 2,3,3',4'-benzophenonetetracarboxylic acid dianhydride, other tetracarboxylic acid dianhydrides, and derivatives thereof. It is preferred to use, out of these compounds, 3,4,3',4'-benzophenonetetracarboxylic acid dianhydride, or a derivative thereof.

The reaction between the diamine and the tetracarboxylic acid analogue can be conducted in the presence of an organic solvent. The organic solvent is not particularly limited, and examples thereof include ethers such as diethylene glycol dimethyl ether, diethylene glycol diethyl ether, triethylene glycol dimethyl ether, and triethylene glycol diethyl ether; sulfur-containing compounds such as dimethylsulfoxide, diethylsulfoxide, dimethylsulfone, and sulfolane; esters such as γ-butyrolactone, and cellosolve acetate; ketones such as cyclohexanone, and methyl ethyl ketone; nitrogen-containing compounds such as N-methylpyrrolidone, dimethylacetoamide, 1,3-dimethyl-3,4,5,6-tetrahydro-2(1H)-pyrimidinone; and aromatic hydrocarbons such as toluene and xylene. These may be used alone or in combination of two or more thereof. In order to prepare a heat-resistant resin paste, it is preferred to use, out of these solvents, the first organic solvent (A1). Nitrogen-containing compounds are more preferred.

The temperature for the reaction between the diamine and the tetracarboxylic acid analogue is preferably set to 25 to 250° C., and the time for the reaction may be appropriately selected in accordance with the scale of the batch, reaction conditions to be adopted, and others.

The method for obtaining the polyimide resin may be a method of dehydrating a polyimide precursor so as to be ring-closed. For the method also, ordinary manners may be used. For example, the following manner may be used: a thermally ring-closing manner of heating the precursor at normal pressure or reduced pressure so as to be dehydrated and ring-closed, a chemically ring-closing manner of using a chemically dehydrating agent such as acetic anhydride in the presence or the absence of a catalyst, and other manners. In the case of the thermally ring-closing manner, it is preferred to conduct the manner while water generated from the dehydrating reaction is removed to the outside of the system. The reaction is conducted preferably at 80 to 400° C., more preferably at 100 to 250° C. Water may be azeotropically removed by using a solvent azeotropic with water, such as benzene, toluene or xylene, together. In the case of the chemically ring-closing manner, the precursor is caused to react preferably at 0 to 120° C., more preferably at 10 to 80° C. in the presence of a chemically dehydrating agent. It is preferred to use, as the chemically dehydrating agent, an acid anhydride such as acetic anhydride, propionic anhydride, butyric anhydride or benzoic anhydride, a carbodiimide compound such as dicyclohexylcarbodiimide, or some other agent. It is also preferred to use a material for promoting the ring-closing reaction, examples thereof including pyridine, isoquinoline, trimethylamine, triethylamine, aminopyridine, and imidazole. The chemically dehydrating agent is used preferably in an amount of 90 to 600% by mole of the whole of the diamine, and the material for promoting the ring-closing reaction is used preferably in an amount of 40 to 300% by mole of the whole of the diamine. A dehydrating catalyst may be used, example thereof including phosphorus compounds such as triphenyl phosphite, tricyclohexyl phosphite, triphenyl phosphate, phosphoric acid, and phosphorus pentoxide, and boron compounds such as boric acid, and boric anhydride. The thermally ring-closing manner is preferred, considering a decrease in the amount of remaining ionic impurities, and others.

The use amount of the heat-resistant resin (B) is preferably from 5 to 80 parts by weight, more preferably from 10 to 70 parts by weight for 100 parts by weight of the total of the heat-resistant resin (B) and the heat-resistant resin filler (C). If the use amount of the heat-resistant resin (B) is less than 5 parts by weight, the flexibility of the resultant paint film tends to lower. If the amount is more than 80 parts by weight, the printability tends to lower.

The heat-resistant resin filler (C) used in the invention may be either of a thermosetting resin or a thermoplastic resin. Examples of the thermosetting resin include addition polymerization type polyimide resins such as terminal-acetylated polyimide resin, terminal-maleimidated polyimide resin, BT RESIN (trade name, manufactured by Mitsubishi Gas Chemical Co., Inc.) and KELIMIDE (trade name, manufactured by Rohne-Poulenc), melamine resin, phenol resin, and epoxy resin. Examples of the thermoplastic resin include polyamide resin, polyimide resin, polyamideimide resin, and precursors of polyimide resin. Of these resins, polyimide resin and precursors thereof are preferred from the viewpoint of heat resistance.

The method for yielding polyimide resin or a precursor thereof as the heat-resistant resin filler (C) is, for example, a method of causing a diamine such as an aromatic diamine compound, an aliphatic diamine compound or an alicyclic diamine compound to react with a tetracarboxylic acid analogue such as a tetracarboxylic acid dianhydride or a derivative thereof. The diamine and tetracarboxylic acid analogue to be used are not particularly limited, and may be selected from the same exemplified about the method for producing the heat-resistant resin (B). Considering solubility in the mixed solvent of the first organic solvent (A1) and the second organic solvent (A2), it is preferred to use a diamine containing an aromatic diamine represented by the following general formula (I) and one or more tetracarboxylic acid analogues containing an aromatic tetracarboxylic acid dianhydride represented by the formula (II) or a derivative thereof:

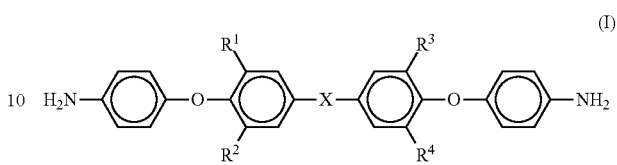

In the formula (I), $R^1$, $R^2$, $R^3$ and $R^4$ are each independently a hydrogen atom, an alkyl group having 1 to 9 carbon atoms, an alkoxy group containing 1 to 9 carbon atoms, or a halogen atom, and X is either one of a chemical bond, —O—, —S—, —SO$_2$—, —C(=O)—, —S(=O)— or a group represented by the following formula (Ia):

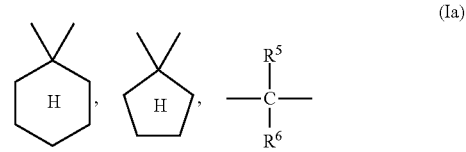

In the formula (Ia), $R^5$ and $R^6$ are each independently a hydrogen atom, an alkyl group, a trifluoromethyl group, a trichloromethyl group, a halogen atom or a phenyl group.

$R^1$, $R^2$, $R^3$ and $R^4$ are each independently a hydrogen atom; an alkyl group having 1 to 9 carbon atoms, such as a methyl, ethyl, propyl, isopropyl, butyl, isobutyl, t-butyl, pentyl, hexyl, heptyl, octyl or nonyl group; an alkoxy group containing 1 to 9 carbon atoms, such as a methoxy, ethoxy, propoxy, butoxy, t-butoxy, pentyloxy, hexyloxy, heptyloxy, octyloxy or nonyloxy group; or a halogen atom, such as chorine, bromine, iodine or fluorine. X is either one of a chemical bond (i.e., biphenyl), —O—, —S—, —SO$_2$—, —C(=O)—, —S(=O)— or a group represented by the formula (Ia). In the formula (Ia), $R^5$ and $R^6$ are each independently a hydrogen atom; an alkyl group, such as a methyl, ethyl, propyl, butyl, isobutyl or pentyl group; or a trifluoromethyl group, a trichloromethyl group, a halogen atom such as chorine, bromine, iodine or fluorine, or a phenyl group. Specific examples of the aromatic diamine represented by the general formula (III) include 2,2-bis[4-(4-aminophenoxy)phenyl]propane, 2,2-bis[4-(4-aminophenoxy)phenyl]hexafluoropropane, 2,2-bis[3-methyl-4-(4-aminophenoxy)phenyl]propane, 2,2-bis[4-(4-aminophenoxy)phenyl]butane, 2,2-bis[3-methyl-4-(4-aminophenoxy)phenyl]butane, 2,2-bis[3,5-dimethyl-4-(4-aminophenoxy)phenyl]butane, 2,2-bis[3,5-dibromo-4-(4-aminophenoxy)phenyl]butane, 1,1,1,3,3,3-hexafluoro-2,2-bis[4-(4-aminophenoxy)phenyl]propane, 1,1,1,3,3,3-hexafluoro-2,2-bis[3-methyl-4-(4-aminophenoxy)phenyl]propane, 1,1-bis[4-(4-aminophenoxy)phenyl]cyclohexane, 1,1-bis[4-(4-aminophenoxy)phenyl]cyclopentane, bis[4-(4-aminophenoxy)phenyl]sulfone, bis[4-(4-aminophenoxy) phenyl]ether, 4,4'-carbonylbis(p-phenyleneoxy)dianiline, and 4,4'-bis(4-aminophenoxy)biphenyl. Of these diamines, 2,2-bis[4-(4-aminophenoxy)phenyl]propane is most preferred.

The reaction between the diamine and the tetracarboxylic acid analogue is conducted in the presence of an organic solvent. It is preferred to use, as the organic solvent, a mixed solvent of the first organic solvent (A1) and the lactone-containing second organic solvent (A2). The use amount of the lactone is preferably from 30 to 90% by weight, more preferably from 40 to 90% by weight, even more preferably from 40 to 85% by weight, in particular preferably from 15 to 50% by weight of the total of the first organic solvent (A1) and the second organic solvent (A2), which contains the lactone. If the use amount of the lactone is less than 5% by weight, the heat-resistant resin filler requires much time for the precipitation thereof, so as to tend to be poor in workability. If the amount is more than 90% by weight, the heat-resistant resin filler tends not to be easily synthesized. The temperature for the reaction is preferably from 10 to 120° C., more preferably from 15 to 100° C. If the reaction temperature is lower than 10° C., the reaction tends not to advance sufficiently. If the temperature is higher than 120° C., the precipitation of the heat-resistant resin filler tends to become insufficient. The time for the reaction may be appropriately selected in accordance with the scale of the batch, reaction conditions to be adopted, and others. The method for obtaining the polyimide resin is as described above.

The use amount of the heat-resistant resin filler (C) is preferably from 20 to 95 parts by weight, more preferably from 30 to 90 parts by weight for 100 parts by weight of the total of the heat-resistant resin (B) and the heat-resistant resin filler (C). If the use amount of the heat-resistant resin filler (C) is less than 20 parts by weight, the printability tends to lower. If the amount is more than 90 parts by weight, the flexibility of the paint film tends to lower.

The pigment (D) used in the invention is preferably powder which is white or close to white in color. For example, titanium dioxide or boron nitride may be used. The average particle diameter of the pigment (D) is preferably less than 10 μm, more preferably from 0.01 to 8 μm, even more preferably from 0.03 to 7 μm, in particular preferably from 0.05 to 5 μm. If the particle diameter is more than 10 μm, the resultant paint film may become brittle.

The blend amount of the pigment (D) is preferably from 0.01 to 50% by weight, more preferably from 0.05 to 45% by weight, even more preferably from 0.1 to 40% by weight, in particular preferably from 0.2 to 35% by weight of the total of the first organic solvent (A1), the second organic solvent (A2), the heat-resistant resin (B), and the heat-resistant resin filler (C). If the blend amount of the pigment (D) is less than 0.01% by weight, the viewability tends to lower after the paint film is patterned. If the amount is more than 50% by weight, the resultant paint film may become brittle.

The heat-resistant resin paste of the invention is a paste wherein the heat-resistant resin filler (C) and the pigment (D) are dispersed in a solution containing the first organic solvent (A1), the second organic solvent (A2), and the heat-resistant resin (B). The method for obtaining this heat-resistant resin paste is, for example, a method of mixing a heat-resistant resin solution wherein the heat-resistant resin (B) is dissolved in an organic solvent, a heat-resistant resin filler dispersion wherein the heat-resistant resin filler (C) is dispersed in an organic solvent, and the pigment (D) with each other. About the heat-resistant resin solution, it is preferred that the heat-resistant resin (B) is dissolved in an organic solvent containing the first organic solvent (A1). About the heat-resistant resin filler dispersion, it is preferred that the heat-resistant resin filler (C) is dispersed in an organic solvent containing the second organic solvent (A2) and the heat-resistant resin (B). The mixing of the heat-resistant resin solution with the heat-resistant resin filler dispersion is conducted preferably at 10 to 180° C., more preferably at 15 to 160° C. If the mixing temperature is lower than 10° C., the heat-resistant resin solution and the heat-resistant resin filler dispersion tend not to be sufficiently mixed with each other. If the temperature is higher than 180° C., the heat-resistant resin filler tends to be dissolved in the organic solvent. In any one of the cases, the printability or paintability tends to deteriorate.

The thixotropic coefficient of the heat-resistant resin paste of the invention is preferably 1.2 or more, more preferably 1.4 or more, even more preferably 1.5 or more, in particular preferably 1.6 or more. If the thixotropic coefficient is less than 1.2, a sufficient printability or paintability tends not to be obtained. The thixotropic coefficient of the heat-resistant resin paste was measured by use of an E type viscometer (RE-80U model, manufactured by Toki Sangyo Co., Ltd.) under conditions that the amount of a sample and the measuring temperature were set to 0.2 g and 25° C., respectively. The coefficient is represented as the ratio of the apparent viscosity $\eta_1$ of the paste at a rotation number of 1 rpm to apparent viscosity $\eta_{10}$ thereof at a rotation number of 10 rpm, $\eta_1\eta_{10}$.

The viscosity ($\eta_{0.5}$, measured at a rotation number of 0.5 rpm) of the heat-resistant resin paste of the invention is preferably from 1 to 1000 Pa·s, more preferably from 3 to 900 Pa·s, even more preferably from 3 to 800 Pa·s, in particular preferably from 5 to 600 Pa·s. If the viscosity of the heat-resistant resin paste is less than 1 Pa·s, the paste tends to drip easily after printed or painted. If the viscosity is more than 1000 Pa·s, the workability tends to deteriorate.

The concentration of the total of the heat-resistant resin (B), the heat-resistant resin filler (C) and the pigment (D) in the heat-resistant resin paste is preferably from 5 to 90% by weight, more preferably from 10 to 90% by weight, in particular preferably from 10 to 80% by weight. If the concentration is less than 5% by weight, the film thickness of the resultant paint film tends not to be easily made large. If the concentration is more than 90% by weight, the fluidity of the paste is damaged so that the workability tends to deteriorate.

The following may be optionally added to the heat-resistant resin paste of the invention: an antifoaming agent, a dye, a plasticizer, an antioxidant, a coupling agent, a resin modifier, and others.

The additives are not particularly limited. For example, the coupling agent is of a silane type, a titanium type, an aluminum type or some other type. A silane coupling agent is most preferred.

The silane coupling agent is not particularly limited. For example, the following may be used: vinyltrichlorosilane, vinyltris(β-methoxyethoxy)silane, vinyltriethoxysilane, vinyltrimethoxysilane, γ-methacryloxypropyltrimethoxysilane, γ-methacryloxypropylmethyldimethoxysilane, β-(3, 4-epoxycyclohexy)ethyltrimethoxysilane, γ-glycycloxypropyltrimethoxysilane, γ-glycycloxypropylmethyldimethoxysilane, γ-glycycloxypropylmethyldiethoxysilane, N-β(aminoethyl) γ-aminopropyltrimethoxysilane, N-β(aminoethyl) γ-aminopropylmethyldimethoxysilane, γ-aminopropyltriethoxysilane, N-phenyl-γ-aminopropyltrimethoxysilane, γ-mercaptopropyltrimethoxysilane, γ-mercaptopropyltriethoxysilane, 3-aminopropylmethyldiethoxysilane, 3-ureidopropyltriethoxysilane, 3-ureidopropyltrimethoxysilane, 3-aminopropyltrimethoxysilane, 3-aminopropyl-tris(2-methoxyethoxyethoxy)silane, N-methyl-3-aminopropyltrimethoxysilane, triaminopropyl-trimethoxysilane, 3-4,5-dihydroimidazol-1-yl-propyltrimethoxysilane, 3-methacryloxypropyl-trimethoxysilane, 3-mercaptopropyl-methyldimethoxysilane, 3-chloropropyl-methyldimethoxysilane, 3-chloropropyl-dimethoxysilane, 3-cyanopropyl-triethoxysilane, hexamethyldisilazane, N,O-bis(trimethylsilyl)acetoamide, methyltrimethoxysilane, methyltriethoxysilane, ethyltrichlorosilane, n-propyltrimethoxysilane, isobutyltrimethoxysilane, amyltrichlorosilane, octyltriethoxysilane, phenyltrimethoxysilane, phenyltriethoxysilane, methyltri(methacryloyloxyethoxy)silane, methyltri(glycidyloxy)silane, N-β(N-vinylbenzylaminoethyl)-γ-aminopropyltrimethoxysilane, octadecyldimethyl[3-(trimethoxysilyl)propyl]ammonium chloride, γ-chloropropylmethyldichlorosilane, γ-chloropropylmethyldimethoxysilane, γ-chloropropylmethyldiethoxysilane, trimethylsilylisocyanate, dimethylsilylisocyanate, methylsilyltriisocyanate, vinylsilyltriisocyanate, phenylsiyltriisocyanate, tetraisocyanate silane, and ethoxysilane isocyanate. These may be used alone or in combination of two or more thereof.

Titanium coupling agent is not particularly limited. For example, the following may be used: isopropyltrioctanoyl titanate, isopropyldimethacrylisostearoyl titanate, isopropyltridodecylbenzenesulfonyl titanate, isopropylisostearoyldiacryl titanate, isopropyltri(dioctylphosphate) titanate, isopropyltricumylphenyl titanate, isopropyltris(dioctylpyrophosphate) titanate, isopropyltris(n-aminoethyl) titanate, tetraisopropylbis(dioctylphosphite) titanate, tetraoctylbis(ditridecylphosphite) titanate, tetra(2,2-diallyloxymethyl-1-butyl)bis(ditridecyl)phosphite titanate, dicumylphenyloxyacetate titanate, bis(dioctylpyrophosphate)oxyacetate titanate, tetraisopropyl titanate, tetra n-butyl titanate, butyl titanate dimer, tetra(2-ethylhexyl) titanate, titanium acetylacetonate, polytitanium ethyl acetonate, titanium octyl glycolate, titanium lactate ammonium salt, titanium lactate, titanium lactate ethyl ester, titanium triethanol aminate, polyhydroxy titanium stearate, tetramethyl orthotitanate, tetraethyl orthotitanate, tetrapropyl orthotitanate, tetraisobutyl orthotitanate, stearyl titanate, cresyl titanate monomer, cresyl titanate polymer, diisopropoxy-bis(2,4-pentadionate)titanium (IV), diisopropyl-bis-triethanolamino titanate, octylene glycol titanate, tetra-n-butoxytitanium polymer, tri-n-butoxytitanium monostearate polymer, and tri-n-butoxytitanium monostearate. These may be used alone or in combination of two or more.

The aluminum coupling agent is not particularly limited. For example, the following may be used: aluminum chelate compounds such as ethylacetoacetate aluminum diisopropylate, aluminum tris(ethylacetoacetate), alkylacetoacetate aluminum diisopropylate, aluminum monoacetylacetate bis (ethylacetoacetate), aluminum tris(acetylacetonate), aluminum monoisopropoxymonooleoxyethylacetoacetate, aluminum-di-n-butoxy-mono-ethylacetoacetate and aluminum-di-iso-propoxide-mono-ethylacetoacetate, and aluminum alkolates such as aluminum isopropylate, mono-sec-butoxyaluminum diisopropylate, aluminum-sec-butylate and aluminum ethylate. These may be used alone or in combination of two or more.

The blend amount of the additives is preferably set to 50 parts or less by weight for 100 parts by weight of the total of heat-resistant resin (B) and the heat-resistant resin filler (C). If the addition amount of the additives is more than 50 parts by weight, the resultant paint film may be brittle.

The heat-resistant resin paste of the invention can be used as a protective film, an insulating film, an adhesive, various heat-resistant printing inks for various devices, such as various semiconductor devices, semiconductor packages, thermal heads, image sensors, high-density multi-chip mounted substrates, diodes, condensers and transistors, and various wired boards such as flexible wired boards and rigid wired boards, and is very useful for industries. When the paste is used, the heat-resistant resin paste is painted onto a paint face of a substrate or the like by screen printing or some other method and then the painted paste is heated under conditions for vaporizing the organic solvent, ordinarily at 50 to 500° C., whereby a paint film can be formed. The method for yielding a precise pattern by use of the heat-resistant resin paste of the invention is not particularly limited, and examples thereof include screen printing, dispense coating, potting, curtain coating, letterpress printing, intaglio printing, and lithography.

EXAMPLES

The invention will be described by way of the following examples in detail; however, the invention is not limited thereto.

[Synthesis of a Heat-resistant Resin Solution]

Synthesis Example 1

Into a 1-L four-necked flask equipped with a thermometer, a stirrer, a nitrogen-introducing tube and a condenser tube with an oil separator were charged 96.7 g (0.3 mol) of 3,4,3',4'-benzophenonetetracarboxylic acid dianhydride, 55.4 g (0.285 mol) of 4,4'-diaminodiphenyl ether, 3.73 g (0.015 mol) of 1,3-bis(3-aminopropyl)tetramethyldisiloxane and 363 g of 1,3-dimethyl-3,4,5,6-tetrahydro-2(1H)-pyrimidinone in nitrogen gas flow, and then the solution was stirred at 70 to 90° C. for about 6 hours. Thereafter, the solution was cooled to terminate the reaction, thereby yielding a heat-resistant resin solution (PI-1) having a number-average molecular weight of 25,000 (measured by a GPC method and calculated out by use of a calibration curve based on standard polystyrene).

[Synthesis of Heat-Resistant Resin Filler Dispersions]

Synthesis Example 2

Into a 1-L four-necked flask equipped with a thermometer, a stirrer, a nitrogen-introducing tube and a condenser tube with an oil separator were charged 96.7 g (0.3 mol) of 3,4,3',4'-benzophenonetetracarboxylic acid dianhydride, 61.5 g (0.15 mol) of 2,2-bis[4-(4-aminophenoxy)phenyl]propane, 27.0 g (0.135 mol) of 4,4'-diaminodiphenyl ether, 3.73 g (0.015 mol) of 1,3-bis(3-aminopropyl)tetramethyldisiloxane, 133.25 g of 1,3-dimethyl-3,4,5,6-tetrahydro-2(1H)-pyrimidinone and 308.59 g of γ-butyrolactone, and then the solution was stirred at 70 to 90° C. for about 5 hours. As a result, a polyimide precursor filler having a number-average molecular weight of 24,000 precipitated in the solution. Thereafter, the solution was cooled to terminate the reaction, thereby yielding a heat-resistant resin filler dispersion (PIF-1).

Synthesis Example 3

Into a 1-L four-necked flask equipped with a thermometer, a stirrer, a nitrogen-introducing tube and a condenser tube with an oil separator were charged 80.5 g (0.25 mol) of 3,4,3',4'-benzophenonetetracarboxylic acid dianhydride, 97.38 g (0.2375 mol) of 2,2-bis[4-(4-aminophenoxy)phenyl]propane, 3.11 g (0.0125 mol) of 1,3-bis(3-aminopropyl)tetramethyldisiloxane, 295.62 g of γ-butyrolactone and 126.69 g of 1,3-dimethyl-3,4,5,6-tetrahydro-2(1H)-pyrimidinone, and then the solution was stirred at 70 to 90° C. for about 7 hours. As a result, a polyimide precursor filler having a number-average molecular weight of 25,000 precipitated in the solution. Thereafter, the solution was cooled to terminate the reaction, thereby yielding a heat-resistant resin filler dispersion (PIF-2).

Synthesis Example 4

Into a 1-L four-necked flask equipped with a thermometer, a stirrer, a nitrogen-introducing tube and a condenser tube with an oil separator were charged 102.9 g (0.35 mol) of 3,3',4,4'-biphenyltetracarboxylic acid dianhydride, 70.0 g (0.35 mol) of 4,4'-diaminodiphenyl ether and 403.4 g of 1,3-dimethyl-3,4,5,6-tetrahydro-2(1H)-pyrimidinone, and then the solution was stirred at 70 to 90° C. for about 8 hours. Thereafter, the solution was cooled to terminate the reaction, and then allowed to stand still as it was for 5 days, thereby yielding a heat-resistant resin filler solution (PIF-3) containing a polyimide precursor filler having a number-average molecular weight of 30,000.

[Synthesis of Heat-resistant Resin Pastes]

Example 1

Into a 1-L four-necked flask equipped with a thermometer, a stirrer, a nitrogen-introducing tube and a condenser tube with an oil separator were charged 300 g of the heat-resistant resin solution (PI-1) yielded in Synthesis Example 1, 400 g of the heat-resistant resin filler dispersion (PIF-1) yielded in Synthesis Example 2, and 7 g of titanium dioxide (trade name: Ti-Pure R-350, manufactured by Du Pont; average particle diameter: 0.3 μm) in nitrogen gas flow. The resultant was then stirred at 50 to 70° C. for 2 hours to yield a heat-resistant resin paste (PIP-1).

About the heat-resistant resin paste (PIP-1) yielded in Example 1, the following evaluations were made.

(Viscosity and Thixotropic Coefficient)

An E type viscometer (RE-80U model, manufactured by Toki Sangyo Co., Ltd.) was used to measure the viscosity and the thixotropic coefficient of the heat-resistant resin paste (PIP-1) under conditions that the sample amount was 0.2 g and the measuring temperature was 25° C. The viscosity was measured at a rotation number of 0.5 rpm, and the thixotropic coefficient was evaluated by use of the ratio of the apparent viscosity η 1 of the paste at a rotation number of 1 rpm to apparent viscosity $\eta_{10}$ thereof at a rotation number of 10 rpm, $\eta_1/\eta_{10}$. The thixotropic coefficient was measured on the basis of JIS-C-2103-8.

(Printability)

The heat-resistant resin paste (PIP-1) was heated and dried on a silicon wafer by use of a screen printer (LS-34GX with an alignment device, manufactured by Newlong Seimitsu Kogyo Co., Ltd.), a meshless metal plate made of nickel alloy additive plating (manufactured by Mesh Corp.; thickness: 50 μm, and pattern size: 8 mm×8 mm) and a Permalex metal squeegee (imported by Tomoe Engineering Co., Ltd.) at 100° C. for minutes. On the basis of the resultant resin film, the printability was evaluated. The evaluation of the printability of the resin film was made by observing whether or not an ooze or drip was generated with an optical microscope.

(Viewability)

A 3-D digital microscope manufactured by Hirox Co. was used to apply side-illumination onto the pattern-attached silicone wafer after the printing. A case where the pattern was able to be clearly viewed is represented by ◯. A case where the pattern was not easily viewed is represented by x.

(Paint Film Properties)

The heat-resistant resin paste (PIP-1) was painted onto a Teflon (registered trade name) substrate, and the resultant was heated at 350° C. for 30 minutes to dry the organic solvent, thereby forming a paint film 25 μm in film thickness. The tensile elasticity (at 25° C. and 10 Hz) thereof and the glass transition temperature (frequency: 10 Hz, and temperature-raising rate: 2° C./min.) thereof were measured with a dynamic viscoelasticity spectrometer (manufactured by Kabushiki Kaisha Iwamoto Seisakusho Corp.).

Moreover, the tensile strength and the rupture elongation were measured with an autograph (trade name: AGS-1000G, manufactured by Shimadzu Corp.). A thermobalance (TG/DTA 220 model, manufactured by Seiko Instruments Co., Ltd.) was used to measure the thermal decomposition starting temperature (5%-weight loss temperature) using alumina for reference in the atmosphere of air under conditions that the sample amount was 10 mg and the temperature-raising rate was 10° C./minute (30-600° C.).

Results of the above are shown together in table 1.

Example 2

Into a 1-L four-necked flask equipped with a thermometer, a stirrer, a nitrogen-introducing tube and a condenser tube with an oil separator were charged 300 g of the heat-resistant resin solution (PI-1) yielded in Synthesis Example 1, 400 g of the heat-resistant resin filler dispersion (PIF-1) yielded in Synthesis Example 2, and 7 g of titanium dioxide (trade name: Ti-Pure R-900, manufactured by Du Pont; average particle diameter: 0.4 μm) in nitrogen gas flow. The resultant was then stirred at 50 to 70° C. for 2 hours to yield a heat-resistant resin paste (PIP-2).

About the resultant heat-resistant resin paste (PIP-2), evaluations were made in the very same way as in Example 1. The results are shown together in table 1.

Example 3

Into a 1-L four-necked flask equipped with a thermometer, a stirrer, a nitrogen-introducing tube and a condenser tube with an oil separator were charged 300 g of the heat-resistant resin solution (PI-1) yielded in Synthesis Example 1, 400 g of the heat-resistant resin filler dispersion (PIF-2) yielded in Synthesis Example 3, and 7 g of titanium dioxide (trade name: Ti-Pure R-350, manufactured by Du Pont; average particle diameter: 0.3 μm) in nitrogen gas flow. The resultant was then stirred at 50 to 70° C. for 2 hours to yield a heat-resistant resin paste (PIP-3).

About the resultant heat-resistant resin paste (PIP-3), evaluations were made in the very same way as in Example 1. The results are shown together in table 1.

Example 4

Into a 1-L four-necked flask equipped with a thermometer, a stirrer, a nitrogen-introducing tube and a condenser tube with an oil separator were charged 300 g of the heat-resistant resin solution (PI-1) yielded in Synthesis Example 1, 400 g of the heat-resistant resin filler dispersion (PIF-1) yielded in Synthesis Example 2, and 7 g of titanium dioxide (trade name: Ti-Pure R-931, manufactured by Du Pont; average particle diameter: 0.6 μm) in nitrogen gas flow. The resultant was then stirred at 50 to 70° C. for 2 hours to yield a heat-resistant resin paste (PIP-4).

About the resultant heat-resistant resin paste (PIP-4), evaluations were made in the very same way as in Example 1. The results are shown together in table 1.

Example 5

Into a 1-L four-necked flask equipped with a thermometer, a stirrer, a nitrogen-introducing tube and a condenser tube with an oil separator were charged 300 g of the heat-resistant resin solution (PI-1) yielded in Synthesis Example 1, 400 g of the heat-resistant resin filler solution (PIF-1) yielded in Synthesis Example 2, and 7 g of boron nitride (trade name: CERAM BLANCHE, manufactured by Mizushima Ferroalloy Co., Ltd.; average particle diameter: 6 μm) in nitrogen gas flow. The resultant was then stirred at 50 to 70° C. for 2 hours to yield a heat-resistant resin paste (PIP-5).

About the resultant heat-resistant resin paste (PIP-5), evaluations were made in the very same way as in Example 1. The results are shown together in table 1.

Example 6

Into a 1-L four-necked flask equipped with a thermometer, a stirrer, a nitrogen-introducing tube and a condenser tube with an oil separator were charged 300 g of the heat-resistant resin solution (PI-1) yielded in Synthesis Example 1, 400 g of the heat-resistant resin filler solution (PIF-1) yielded in Synthesis Example 2, and 280 g of titanium dioxide (trade name: Ti-Pure R-350, manufactured by Du Pont; average particle diameter: 0.3 μm) in nitrogen gas flow. The resultant was then stirred at 50 to 70° C. for 2 hours to yield a heat-resistant resin paste (PIP-6).

About the resultant heat-resistant resin paste (PIP-6), evaluations were made in the very same way as in Example 1. The results are shown together in table 1.

Comparative Example 1

Into a 1-L four-necked flask equipped with a thermometer, a stirrer, a nitrogen-introducing tube and a condenser tube with an oil separator were charged 300 g of the heat-resistant resin solution (PI-1) yielded in Synthesis Example 1, and 400 g of the heat-resistant resin filler dispersion (PIF-1) yielded in Synthesis Example 2 in nitrogen gas flow. The resultant was then stirred at 50 to 70° C. for 2 hours to yield a heat-resistant resin paste (PIP-7).

About the resultant heat-resistant resin paste (PIP-7), evaluations were made in the very same way as in Example 1. The results are shown together in table 1.

Comparative Example 2

Into a 1-L four-necked flask equipped with a thermometer, a stirrer, a nitrogen-introducing tube and a condenser tube with an oil separator were charged 300 g of the heat-resistant resin solution (PI-1) yielded in Synthesis Example 1, 400 g of the heat-resistant resin filler dispersion (PIF-3) yielded in Synthesis Example 4, and 7 g of titanium dioxide (trade name: Ti-Pure R-350, manufactured by Du Pont; average particle diameter: 0.3 μm) in nitrogen gas flow. The resultant was then stirred at 50 to 70° C. for 2 hours to yield a heat-resistant resin paste (PIP-8).

About the resultant heat-resistant resin paste (PIP-8), evaluations were made in the very same way as in Example 1. The results are shown together in table 1.

TABLE 1

| | | Examples | | | | | | Comparative Examples | |
|---|---|---|---|---|---|---|---|---|---|
| | | 1 | 2 | 3 | 4 | 5 | 6 | 1 | 2 |
| Paste properties | Viscosity (Pa·s) | 200 | 200 | 210 | 200 | 200 | 250 | 200 | 60 |
| | Thixotropic coefficient | 4.2 | 4.1 | 4.2 | 4.0 | 4.1 | 4.0 | 4.5 | 1.1 |
| | Printability (whether or not an ooze or drip was observed) | Not observed | Not observed | Not observed | Not observed | Not observed | Not observed | Not observed | Observed |
| | Viewability | ○ | ○ | ○ | ○ | ○ | ○ | X | ○ |
| Paint film properties | Tensile elasticity(MPa) | 3300 | 3300 | 3400 | 3300 | 3300 | 4000 | 3300 | 3300 |
| | Glass transition temperature(° C.) | 260 | 260 | 260 | 260 | 260 | 260 | 260 | 260 |
| | Thermal decomposition starting temperature(° C.) | 500 | 505 | 500 | 500 | 495 | 530 | 490 | 490 |
| | Tensile strength(MPa) | 100 | 95 | 100 | 100 | 85 | 90 | 100 | 100 |
| | Rapture elongation(%) | 20 | 20 | 20 | 20 | 15 | 13 | 20 | 20 |

From Table 1, the heat-resistant resin paste (Examples 1 to 6) of the invention is excellent in heat resistance, workability and viewability. Furthermore, the paste makes it possible to form a precise pattern by screen printing, disperse coating or the like. Thus, a semiconductor device using the heat-resistant resin paste of the invention gives good properties.

On the other hand, it is understood that the heat-resistant resin paste of Comparative Example 1 containing no pigment is poor in viewability, and the heat-resistant resin paste of Comparative Example 2 containing no lactone as a organic solvent is low in viscosity and thixotropic coefficient, so as to be poor in printability.

The invention claimed is:
1. A heat-resistant resin paste, comprising a first organic solvent (A1), comprises a nitrogen-containing cyclic compound having polarity,
a second organic solvent (A2) containing a lactone, wherein the lactone is δ-butyrolactone,
a heat-resistant resin (B) soluble in the first organic solvent of (A1) or a mixed solvent of the first organic solvent (A1) and the second organic solvent (A2),
a heat-resistant resin filler (C) insoluble in the mixed solvent of the first organic solvent (A1) and the second organic solvent (A2), and a pigment (D), wherein the pigment (D) is a powder which is white in color of titanium dioxide,
wherein the heat-resistant resin filler (C) and the pigment (D) are dispersed in a solution containing the first organic solvent (A1), the second organic solvent (A2), and the heat-resistant resin (B),
wherein the heat resistant resin filler (C) comprises a polyimide resin, a polyamideimide resin, a polyamide resin, or a precursor thereto.

2. The heat-resistant resin paste according to claim 1, wherein the soluble heat-resistant resin (B) and the heat-resistant resin filler (C) are each a polyimide resin or a precursor thereof.

3. The heat-resistant resin paste according to claim 2, wherein the polyimide resin or the precursor of the heat-resistant resin filler (C) is obtained by causing the following to react with each other in the presence of the mixed solvent of the first organic solvent (A1) and the second organic solvent (A2), which contains the lactone: a diamine containing an aromatic diamine represented by the following general formula (I), and one or more tetracarboxylic acid analogues including an aromatic tetracarboxylic acid dianhydride represented by the following general formula (II) or a derivative thereof:

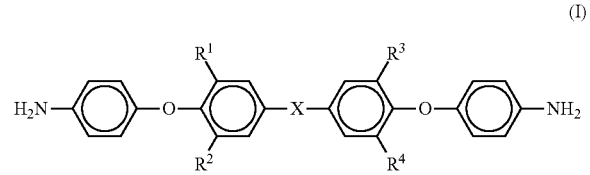

wherein $R^1$, $R^2$, $R^3$ and $R^4$ are each independently a hydrogen atom, an alkyl group having 1 to 9 carbon atoms, an alkoxy group containing 1 to 9 carbon atoms, or a halogen atom, and X is either one of a chemical bond, —O—, —S—, —SO$_2$—, —C(=O)—, —S(=O)— or a group represented by the following formula (Ia):

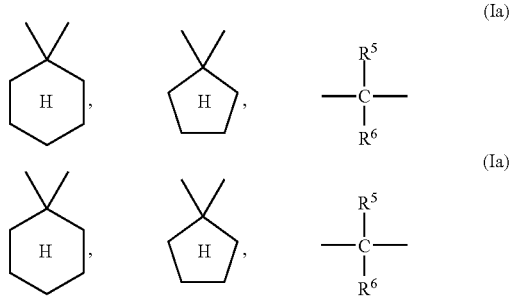

wherein $R^5$ and $R^6$ are each independently a hydrogen atom, an alkyl group, a trifluoromethyl group, a trichloromethyl group, a halogen atom or a phenyl group, and

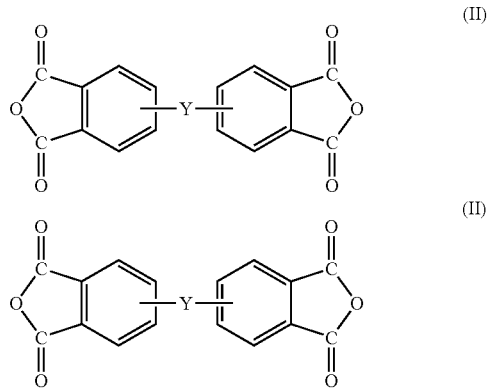

wherein Y is either one of —O—, —S—, —SO$_2$—, —C(=O)—, or —S(=O)—.

4. The heat-resistant resin paste according to claim 1, wherein the average particle diameter of the pigment (D) is less than 10 μm.

5. The heat-resistant resin paste according to claim 1, which has a thixotropic coefficient of 1.2 or more.

6. The heat-resistant resin paste according to claim 1, wherein an amount of pigment (D) is from 0.2 to 35% by weight of the total of the first organic solvent (A1), the second organic solvent (A2), the heat-resistant resin (B), and the heat-resistant resin filler (C).

7. The heat-resistant resin paste according to claim 1, wherein the pigment (D) is powder having an average particle diameter of 0.01 to 8 μm.

8. The heat-resistant resin paste according to claim 7, wherein said average particle diameter of powder of the pigment (D) is 0.05 to 5 μm.

9. The heat-resistant resin paste according to claim 1, having properties that it can be screen-printed on a silicon wafer and heated at a temperature in a range of 50° to 500° C. to vaporize the first and second organic solvents.

10. The heat-resistant resin paste according to claim 1, wherein the first organic solvent is included in the resin paste in an amount of at least 40% by weight of the total weight of the first and second organic solvents, and said lactone is included in the resin paste in an amount of 10% to 60% by weight of the total weight of the first and second organic solvents.

11. The heat-resistant resin paste according to claim 1, wherein a boiling point of a mixed solvent of the first and second organic solvents is at least 100° C.

12. The heat-resistant resin paste according to claim 1, wherein the heat-resistant resin filler is included in the resin paste in an amount of 20 to 95parts by weight per 100 parts by weight of the total weight of the heat-resistant resin and the heat-resistant resin filler.

13. A method for forming a paint film, which comprises:
screen printing the heat-resistant resin paste of claim 1 on a silicon wafer, and heating the screen-printed paste at a temperature of 50° to 500° C.

* * * * *